United States Patent [19]

Lundberg et al.

[11] Patent Number: 4,737,534

[45] Date of Patent: * Apr. 12, 1988

[54] METHOD FOR CONTROLLING VISCOSITY OF ORGANIC LIQUIDS AND COMPOSITIONS THEREOF

[75] Inventors: Robert D. Lundberg, Bridgewater; Robert R. Phillips, Spring Lake Hghts; Dennis G. Peiffer, East Brunswick; Ilan Duvdevani, Leonia, all of N.J.

[73] Assignee: Exxon Research and Engineering Company, Florham Park, N.Y.

[*] Notice: The portion of the term of this patent subsequent to Oct. 30, 2001 has been disclaimed.

[21] Appl. No.: 720,722

[22] Filed: Apr. 8, 1985

Related U.S. Application Data

[63] Continuation-in-part of Ser. No. 547,908, Nov. 2, 1983, abandoned.

[51] Int. Cl.$^4$ .......................... C08K 5/05; C08K 5/01; C08L 39/08; C10M 111/04
[52] U.S. Cl. .................... 524/385; 524/390; 524/516; 524/505; 525/203; 252/33.4; 44/62
[58] Field of Search ............... 252/33.4; 525/203, 919; 524/516, 521, 501, 504, 390, 385, 505

[56] References Cited

U.S. PATENT DOCUMENTS

| | | | |
|---|---|---|---|
| 3,475,358 | 10/1969 | Bixler | 524/521 |
| 3,546,142 | 1/1967 | Michaels | 524/521 |
| 3,867,330 | 2/1975 | Frisque | 524/516 |
| 4,118,439 | 10/1978 | Marze | 525/203 |
| 4,480,063 | 10/1984 | Lundberg | 524/516 |
| 4,483,957 | 11/1984 | Lundberg | 524/516 |
| 4,497,923 | 2/1985 | Lundberg | 524/521 |
| 4,537,919 | 8/1985 | Agarwal | 524/516 |
| 4,552,916 | 11/1985 | Lundberg | 524/516 |

*Primary Examiner*—C. Warren Ivy
*Attorney, Agent, or Firm*—Richard E. Nanfeldt

[57] ABSTRACT

The instant invention relates to a process for controlling the viscosity of organic liquids by incorporating in said liquid a minor amount of polymer complex, and optionally a cosolvent for the ionic groups of said polymer. The polymer complex comprises the reaction product of a metal neutralized sulfonated polymer and a basic nitrogen-containing polymer, wherein the polymer complex is substantially soluble in said organic liquid, and pendant sulfonate groups which are substantially insoluble in said organic liquid. The optional cosolvent is selected which will solubilize the pendant sulfonate groups and provide a reasonably homogeneous mixture of solvent, cosolvent and polymer complex. The preferred compositions prepared by the method of the instant invention comprise an organic liquid having a solubility parameter of from 6 to 10.5 in combination with a polymer complex containing from 0.2 up to 10.0 mole % sulfonate groups and nitrogen-containing groups, and optionally a nonvolatile alcohol or amine cosolvent.

12 Claims, No Drawings

METHOD FOR CONTROLLING VISCOSITY OF ORGANIC LIQUIDS AND COMPOSITIONS THEREOF

This application is a continuation-in-part of copending application U.S. Ser. No. 547,908, filed Nov. 2, 1983, now abandoned.

FIELD OF THE INVENTION

The instant invention relates to a process for controlling the viscosity of organic liquids by incorporating in said liquid a minor amount of two interacting polymers and optionally, a cosolvent for the ionic groups of said polymer. The ionic polymer comprises a backbone which is substantially soluble in said organic liquid and pendant ionic groups which are substantially insoluble in said organic liquid. The other polymer contains basic nitrogen atoms such as amine groups which interact with the ionic counterion and form a complex. A cosolvent is selected which will optionally solubilize the pendant ionomeric groups and provide a reasonably homogeneous mixture of solvent, cosolvent and ionomeric polymer. The preferred compositions prepared by the method of the instant invention comprise an organic liquid having a solubility parameter of from 6 to 10.5 in combination with a sulfonated polymer containing from 0.2 up to 10.0 mole % ionic groups which has been neutralized by a basic material selected from Groups IA and IIA, IB and IIB and also lead, tin and antimony of the Periodic Table of the Elements, wherein the sulfonated polymer is complexed with a polymer containing basic nitrogen atoms such as an amine-containing polymer and optionally, a nonvolatile alcohol or amine as the cosolvent.

BACKGROUND OF THE PRIOR ART

The rapid decrease in viscosity of liquids with increasing temperature is well-known. Ideally, for many applications (automobile lubricants, etc.) it would be desirable to solve this problem so that viscosity would be insensitive to temperature. Alternatively, it might be desirable to provide liquid systems whose viscosities actually increase with temperature. It is true that with selected polymeric additives, it has been possible to reduce substantially the viscosity change with temperature which does occur with most oils and similar systems. These polymer additives, known as viscosity index improvers (or V.I. Improvers) are generally high molecular weight polymers.

The way in which these additives function can be summarized very briefly. In effect, they perform two functions, i.e., thickening, which merely increases fluid viscosity; and Viscosity Index (V.I.) improvement, which corresponds to limited thickening at ambient temperatures and a correspondingly greater thickening at elevated temperatures. This can be accomplished by utilizing a polymeric additive which is poorly solvated by the liquid at ambient temperatures; however, at elevated temperatures the polymer is more highly solvated such that the polymer expands and is a relatively more effective thickener.

While these V.I. Improvers have proven successful commercially, it is important to note that their effect at reducing viscosity changes with temperatures is rather mild. For a typical base oil containing a suitable V.I. Improver, the kinematic viscosity will still decrease by a factor of from 5 to 10 as the temperature increases from 30° to 100° C. Obviously, if it is desired to hold the viscosity roughly constant with such temperature changes, current technology has not offered an appropriate additive system.

U.S. Pat. No. 3,396,136 describes how copolymers of alkenyl aromatic sulfonic acids, when properly neutralized, can be employed as thickeners for nonpolar solvents. Those metal sulfonate systems have been shown to be very effective; however, when employed as two component systems (i.e., ionic polymer plus nonpolar solvent), the variation of viscosity with increased temperature is very conventional and predictable. That is, the solution viscosity decreases markedly as temperature is increased.

U.S. Pat. No. 3,396,136 further teaches "in situ" neutralization of the sulfonic acid polymer which, under some conditions, can result in the availability of a small amount of polar cosolvent—i.e., a solvent for the sulfonate groups about equal in amount to the amount of sulfonate groups which are present. This amount of polar cosolvent is not within the limits of the instant invention, which only optionally requires amounts of the third component (which interacts with the ionomeric groups of the ionomer copolymer) at levels which range from 10 to 600 times the molar equivalence of ionic groups. This level of cosolvent is about one to two orders of magnitude or more higher than employed in the cited art. In addition, the cited patent is restricted to aromatic sulfonate polymers. The instant invention describes other polymers such as sulfonated ethylene propylene terpolymers, sulfonated Butyl, etc., which are a portion of the polymer complex.

U.S. Pat. No. 3,366,430 teaches the gelling of organic liquids by the interaction of polar "associative bonds" which includes hydrogen bonding and "ionic cross-linking". Again, this patent specifies that two components are necessary—the associating polymer (or polymers in some cases) and the nonpolar organic liquid. There is no mention of a third polar cosolvent except to point out that such polar liquids should not be present. Specifically, this patent states (Column 2, line 7) that the hydrocarbon liquids to which this invention is to be applied should not contain a substantial portion of a miscible protolytic liquid such as methanol. It is clear that the language of this patent limits this invention to gels and further, that any amount of polar liquids which are present to an extent where they disrupt those gels are undesirable. The instant invention is distinct from that cited in that amounts of such polar compounds, as will break up gel at ambient conditions, are required and in fact the most preferred state is free of any said gel at ambient temperatures.

U.S. Pat. No. 3,679,382 teaches the thickening of aliphatic hydrocarbons with synthetic organic polymers which contain olefinically unsaturated copolymerizable acids, amides, hydroxyacrylic esters, sulfonic acids, etc. It is emphasized in this patent (Column 3, line 72) that it is critical that in the preparation of such polymers, no surface active agent, catalyst or other additive be employed which introduces a metallic ion into the system. Therefore, it is preferred to employ ammonium or amine salts. It is clear that this invention (U.S. Pat. No. 3,679,382) specifically precludes the use of metallic counterions—and is directed towards amine or ammonium derivatives. Only metallic counterions are effective in the instant invention—and that, in fact, attempts to employ amine derivatives have not resulted in the results which are the objectives of this invention. Finally, this cited patent does describe (Column 7, lines 13–19) that the addition of alcohols will reduce the viscosity of the thickened hydrocarbon and alter flow characteristics thereof.

U.S. Pat. Nos. 3,931,021 and 4,118,361 describe the use of ionic polymers and required cosolvents in an organic liquid and V.I. Improvers. The instant invention represents an improvement over U.S. Pat. Nos. 3,931,021 and 4,118,361, and therefore provides a new dimension in viscosity control of hydrocarbon-based solvents. Specifically, it has been discovered that these complexes offer a "flatter" viscosity-temperature relationship than do the sulfonate ionomers previously disclosed. Furthermore, the types of ionic polymers previously described as viscosifiers for oils and low polarity diluents usually are effective thickeners at modest levels, but if one attempts to make a concentrate (~10% polymer by weight) the resulting solution is too viscous to handle. The solutions described in this invention can have relatively low viscosities at high concentrations of polymer, yet maintain relatively high viscosities at low polymer concentrations. This change in the viscosity-concentration relationship is a fundamental discovery of potentially great practical relevance.

SUMMARY OF THE INVENTION

It has been discovered that the viscosity of organic liquids may be conveniently controlled by incorporating in said organic liquid a minor amount of a polymer complex which is the reaction product of a sulfonated polymer and a polymer containing low levels of nitrogen atoms. The polymer complex is characterized as having polymer backbones which are substantially soluble in the organic liquid, and pendant sulfonate groups which are substantially insoluble in the organic liquid.

The number of sulfonate groups contained in the sulfonated polymer of the polymer complex is a critical parameter affecting this invention. The number of sulfonate groups present in the polymer can be described in a variety of ways such as weight percent, mole percent, number per polymer chain, etc. For most polymer systems of interest in this invention, it is desirable to employ mole percent. For vinyl homopolymers, such as polystyrene, the sulfonated analog having a sulfonate content of 1.0 mole percent means that one out of every 100 monomer repeat units in the polymer chain is sulfonated. In the case of copolymers, the same definition applied, except for the purposes of this calculation, the polymer can be considered to be prepared from a hypothetical monomer having an average molecular weight, which is the average of the two monomer components. Similarly for terpolymers, the same averaging concepts apply; however, three compoments are involved. For example, ethylene-propylene-ethylidene norbornene (ENB) is a preferred polymer backbone for this invention. A representative terpolymer would have a composition (weight percent) of 50% ethylene, 45% propylene and 5% ENB. This composition has an average repeat unit molecular weight of about 38.9. Thus, sulfonation of this composition, which occurs at the unsaturation of the ENB units to a level of 1.0 mole %, which means that in 38.9 gms (1 mole of average monomer repeat units) of this polymer, there would be present 0.01 mole of sulfonic acid groups. An alternate way of expressing this is to state the sulfonate level in terms of milliequivalents of sulfonic acid groups per 100 gms of polymer or meq. per 100 g. of polymer. This latter procedure provides a rapid and independent measure of sulfonic acid content in a polymer through simple titration.

Both mole percent sulfonate and milliequivalent of sulfonate will be employed to describe the sulfonate polymers employed in this invention.

In general, the sulfonated polymer will comprise from about 4 meq. up to 500 meg. of sulfonate groups per 100 g. of polymer, more preferably about 10 meq. to about 100 meq. of pendant sulfonate groups per 100 g. of polymer. Sulfonated polymers which are subject to the process of the instant invention are illimitable and include both plastic and elastomeric polymers. Specific polymers include sulfonated polystyrene, sulfonated t-butyl styrene, sulfonated polyethylene, sulfonated polypropylene, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylenepropylene terpolymers, sulfonated polyisoprene, and sulfonated elastomers and their copolymers such as isoprene-styrene sulfonate copolymer or styrene/butadiene/metal styrene sulfonate terpolymers formed by a free radical copolymerization process.

The sulfonated polymers of the instant invention may vary in number average molecular weight from 1,000 to 10,000,000, preferably 5,000 to 500,000, most preferably from 10,000 to 200,000. These polymers may be prepared by methods known in the art; for example, see U.S. Pat. No. 3,642,728, hereby incorporated by reference.

Neutralization of the cited sulfonated polymers with appropriate metal hydroxides, metal acetates, metal oxides, etc. can be conducted by means well-known in the art. For example, the sulfonation process as with Butyl rubber containing a small 0.3 to 1.0 mole% unsaturation, can be conducted in a suitable solvent such as toluene with acetyl sulfate as the sulfonating agent. The resulting sulfonic acid derivative can then be neutralized with a number of different neutralization agents such as sodium phenolate and similar metal salts. The amounts of such neutralization agents employed will normally be stoichiometrically equal to the amount of free acid in the polymer plus any unreacted reagent which still is present. It is preferred that the amount of neutralizing agent be equal to the molar amount of sulfonating agent originally employed plus 10% more to ensure full neutralization. The use of more of such neutralization agent is not critical. Sufficient neutralization agent is necessary to effect at least 50% neutralization of the sulfonic acid groups present in the polymer, preferably at least 90%, and most preferably essentially complete neutralization of such acid groups should be effected. The degree of neutralization of said ionomeric groups may vary from 50 to 500 mole %, preferably 90 to 200%. Most preferably, it is preferred that the degree of neutralization be substantially complete, that is, with no substantial free acid present and without substantial excess of the base other than that needed to ensure neutralization. Thus, it is clear that the polymers which are utilized in the instant invention comprise substantially neutralized pendant groups and, in fact, an excess of the neutralizing material may be utilized without defeating the objects of the instant invention.

We have surprisingly found that a very important factor in determining the strength in the reaction product of the interaction between the amine-containing polymer and the sulfonate-containing polymer is the nature of the counterion. There are, broadly speaking, three major classes of such counterions. The first class, which are less preferred, are those metals of Group I and Group IIA, which include Li, Na, K, etc., Be, Mg, Ca, etc. We have found that these species do not interact as strongly with amine groups as the more preferred species described below. Those metals are commonly defined as members of the transition elements (see chemical text: "Chemical Principles and Properties", by M. J. Sienko and R. A. Plane, McGraw Hill Book Co., 1974, page 19). These metal cations are best exemplified by zinc and interact strongly with pyridine and similar amines. As a consequence, a zinc neutralized sulfonated polymer interacts much more strongly with a styrene/vinyl pyridine copolymer than does a magnesium or sodium neutralized system. It is for this reason that the transition elements are preferred with zinc, copper, iron, nickel and cobalt being especially preferred. We also include antimony and lead as suitable cations.

A third species which is preferred is the free acid of the sulfonated polymer, which will also interact with amine-containing polymers. In this latter case, it is clear that the interaction is a classic acid-base interaction, while with the transition metals, a true coordination complex is created, which is due to the donation of the electron pair of the nitrogen element. This distinction is a very important one and sets these complexes apart from classic acid-base interactions. The surprising observation is that such coordination complexes can form in such extreme dilution insofar as interacting groups are concerned, and that they are apparently formed so far removed from their expected stoichiometry, (based on small molecule analogs).

| Sulfonate Polymer | Amine Polymer |
|---|---|
| Sulfonated EPDM | Styrene/Vinyl Pyridine Copolymer |
| Sulfonate Isoprene Copolymers | Vinyl Pyridine/Styrene/ Butadiene Terpolymers |
| Sulfonate Butadiene Polymers | Isoprene/Vinyl Pyridine Copolymer |
| Sulfonated Butyl | |
| Sulfonated Acrylate and Methacrylate Copolymers | Ethylacrylate/Vinyl Pyridine Copolymer and Alkyl Acrylate Copolymers with Vinyl Pyridine, where the Alkyl group varies in carbon number from 1 to to 18 Methyl Methacrylate/Vinyl Pyridine Pyridine Copolymer and Alkyl Methacrylate copolymers with Vinyl Pyridine, wherein the number of carbon groups in the alkyl group varies from 1 to 18 carbon atoms. Butadiene/Vinyl Pyridine Copolymer Propylene/Vinyl Pyridine Block Copolymer Ethylene/Vinyl Pyridine Block Copolymer t-Butyl Styrene/Vinyl Pyridine Copolymers Vinyl Pyridine Copolymers with alpha-beta ethylenically unsaturated copolymers or terpolymers. |
| Sulfonated Block Polymers | |
| Sulfonated Polystyrene | |
| Sulfonated Poly-t-butyl Styrene | |
| Sulfonate-containing copolymers of the above systems | |

Preferably, the amine content in the basic polymer is expressed in terms of basic nitrogen. In this respect the nitrogen content in amides and similar nonbasic nitrogen functionality is not part of the interacting species. For example, the amount of vinyl pyridine in the amine-containing polymer can vary widely, but should range from less than 50 weight percent down to at least 0.5 weight percent of the weight of the total copolymer.

A minimum of three basic groups must be present on the average per polymer molecule and the basic nitrogen content generally will range from 4 meq. per 100 grams of polymer up to 500 meq. per 100 g. A range of 8 to 200 meq. per 100 g. is preferred.

It is evident that the water insoluble sulfonated polymers covered within this invention encompass a broad class of hydrocarbon polymer systems. It is important that these hydrocarbon polymer backbones (in the absence of the sulfonate groups) be soluble in the organic liquid, whose viscosity is to be controlled. To achieve the desired solubility, it is required that the polymer to be employed possess a degree of polarity consistent with that solvent. This solubility relationship can be readily established by anyone skilled in the art simply by appropriate texts (e.g., Polymer Handbook, edited by Brandrup and Immergut, Interscience Publishers, 1967, section IV-341). In the absence of appropriate polymer solvent compatibility knowledge, this can be determined experimentally by observing whether the selected polymer will be soluble in the solvent at a level of 1 gm polymer per 100 ml solvent. If the polymer is soluble, then this demonstrates that it is an appropriate backbone for modification with sulfonate groups to achieve the objectives of this invention. It is also apparent that polymers which are too polar will not be soluble in the relatively nonpolar organic liquids of this invention. Therefore, only those polymer backbones (i.e., as measured in the absence of ionic groups) having a solubility parameter less than 10.5 are suitable in this invention. This precludes the use of such polymers as polyvinyl alcohol, polyacrylonitrile, etc. Also highly crystalline polymers are to be avoided since they tend not to be soluble in the relatively nonpolar organic liquids employed herein. Therefore, acceptable polymers employed in this invention must possess a level of crystallinity of less than 25%. Thus, these acceptable polymers can be considered substantially noncrystalline.

The preferred ionic EPDM terpolymers for use in the instant invention are prepared by sulfonation of an EPDM-containing ethylidene norbornene units. Other specific examples of preferred ionomeric polymers which are useful in the instant invention include sulfonated polystyrene, sulfonated poly-t-butyl styrene, sulfonated polyethylene, (substantially non-crystalline) and sulfonated polyethylene copolymers, sulfonated polypropylene (substantially noncrystalline), and sulfonated polypropylene copolymers, sulfonated styrene-methyl methacrylate copolymers, (styrene)acrylic acid copolymers, sulfonated polyisobutylene, sulfonated ethylenepropylene terpolymers, sulfonated polyisoprene, sulfonated polyvinyl toluene, sulfonated polyvinyl toluene copolymers and isoprene-styrene sulfonate copolymers formed by a free radical copolymerization process.

The ionomeric polymers of the instant invention may be neutralized prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well-known to those skilled in the art; i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability and the above operations avoid that problem.

The water insoluble basic nitrogen-containing polymer such as styrene-vinyl pyridine copolymer of the water insoluble polymer complex is formed by free radical copolymerization using techniques well-known in the polymer literature. Such polymers can be prepared by a variety of techniques by reacting a basic nitrogen-containing monomer with alpha-beta ethylenically unsaturated monomers such as styrene, t-butyl styrene, alkyl acrylates, alkyl methacrylates, butadiene, isoprene vinyl chloride, acrylonitrile, acrylonitrile/butadiene/styrene monomer mixtures and copolymers, or more complex mixtures. An emulsion polymerization process is generally preferred, but other processes are also acceptable.

The polymer complex of the sulfonated polymer and the basic nitrogen-containing polymer can be formed by forming a first solution of the sulfonated polymer in an organic liquid and a second solution of the basic nitrogen-containing polymer in the organic liquid, wherein the organic liquid which has a solubility parameter of less than 9.5 and a viscosity of less than about 35 centipoises and is selected from the group consisting of mineral oil, synthetic oil, lubricating oils, alkanes, cycloalkanes and aromatic hydrocarbons and mixtures thereof. Alternately both components of the complex can be simultaneously dissolved in the same solvent systems at the desired concentrations. The concentration of the sulfonated polymer in the first solution is about 0.05 to about 10 grams per 100 ml of organic liquid, more preferably about 0.1 to about 5. The concentration of the basic nitrogen-containing polymer in the second solution is about 0.05 to about 10 grams per 100 ml of the organic liquid, more preferably about 0.1 to about 5, and most preferably about 0.1 to about 2. The two solutions of the sulfonated polymer and the basic nitrogen-containing polymer are mixed together to form the polymer complex, wherein either the sulfonated polymer or the basic nitrogen-containing polymer such as styrene-vinyl pyridine copolymer can be substantially in excess of the other. The formation of the complex is schematically represented by:

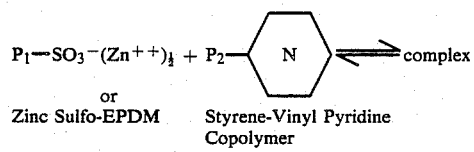

$P_1-SO_3^-(Zn^{++})_{\frac{1}{2}} + P_2-\langle N \rangle \rightleftharpoons$ complex (1)

or

Zinc Sulfo-EPDM    Styrene-Vinyl Pyridine Copolymer

The presence of an excess of one component over the other offers a unique opportunity to alter the viscosity-temperature profiles of such solutions. In the creation of the complex a combination of two polymers interacting with an excess of one (such as the styrene/vinyl pyridine copolymer), we have created a complex which is, in turn, plasticized. Such a system will display modest viscosity at low or ambient temperatures:

Excess Complex + Polymer Component ⟶ Plasticized Complex (2)

The application of heat to the right-hand side of Equation 2 would be expected to shift the equilibrium modestly to the left. Consequently, the higher viscosity complex would be favored with a potential increase in solution viscosity.

The weight ratio of the neutralized sulfonated polymer to the amine containing polymer which contains basic nitrogen groups is about 20/1 to about 1/20.

Thus, this concept describes the interaction of two polymers which can give rise to new solution phenomena. A second consequence of this concept is that if such solutions are diluted with non-interactive (less interactive) solvent, such as mineral oil or similar low polarity diluents, the result will be a diminution of the plasticizer component with a relative increase in complex viscosity. Thus, unlike normal polymer solutions which drop off dramatically upon dilution, these solutions may decrease much less in their solution viscosity. Such hydrocarbon or oil solutions have not been available previously. The concentration of the polymer complex in the organic liquid is about 0.05 to about 20 grams per 100 ml, more preferably about 0.1 to about 10, and most preferably about 0.2 to about 10.

The method of the instant invention includes optionally incorporating a cosolvent, for example, a polar cosolvent, into the mixture of organic liquid and polymer complex, to solubilize the pendant sulfonate groups. The polar cosolvent will have a solubility parameter of at least 10.0, more preferably at least 11.0, and may comprise from 0.1 to 40, preferably 0.5 to 20 weight percent of the total mixture of organic liquid, ionomeric polymer, and polar cosolvent wherein the polar cosolvent is selected from the group consisting of alcohols and amines.

In addition to the requirements for ionic polymer, organic liquid and polar cosolvent, there is the additional and important constraint that the polar cosolvent be more polar than the organic liquid. This is required in order that the proper interaction between polar cosolvent and ionic groups be obtained. If we designate the solubility parameter of the organic liquid as $S_L$, and the solubility parameter of the polar cosolvent as $S^p$, then we require that:

$$S_p \geq S_L + 1.0$$

In other words, the polar cosolvent will be substantially more polar than the organic liquid to be thickened.

Normally, the polar cosolvent will be a liquid at room temperature, however, this is not a requirement. It is required that the polar cosolvent be soluble or miscible with the organic liquid at the levels employed in this invention. Under normal circumstances, this miscibility requirement precludes the use of water as a polar cosolvent. The polar cosolvent must be present in amounts of from 10 to 600 moles per mole of ionic group in order to give the desirable results of the instant invention and preferably from 20 to 400 moles per mole of ionic group.

DESCRIPTION OF THE PREFERRED EMBODIMENTS

The following are preferred embodiments of the instant invention.

EXAMPLE 1

Preparation of Styrene-4-Vinyl Pyridine Copolymer

A copolymer of styrene-4-vinyl pyridine was prepared via a free radical emulsion copolymerization process. The preparation was conducted as follows:

In a suitable, stirred reaction vessel under a nitrogen blanket the following ingredients were charged:
120 ml. distilled water
50 g. styrene
3.2 g. sodium lauryl sulfate
0.1 g. dodecylthiol
0.2 g. potassium persulfate
4.7 g. 4-vinyl pyridine The polymerization was conducted at 50° C. for 24 hours and the resultant emulsion was fluid and uniform. Three ml. of methanol containing 0.1% of hydroquinone was added as an inhibitor and the reaction mixture was precipitated in a large excess of acetone. The precipitate was filtered, then suspended in methanol and blended in a Waring blender to finally disperse the coagulated polymer. The suspension was filtered and dryed in a vacuum oven at 60° C. for 24 hours.

The resulting product represented 80% conversion of the reactive monomers and contained 1.68% nitrogen corresponding to 12.5 mole % 4-vinyl pyridine incorporation.

EXAMPLE 2

Preparation of Sulfonated EPDM

The preparation of sulfonated EPDM has been well-described in the patent and published literature (for example, see U.S. Pat. No. 4,184,988 or ACS Monograph edited by A. Eisenberg, 1980, p. 4). A zinc sulfonated EPDM was prepared via those procedures containing 10 meq. of zinc sulfonate, designated TP 398. The resulting polymer was available as a free-flowing crumb and employed in that form as a blending component in the following examples.

EXAMPLE 3

Preparation of Polymer Complex

The polymer complex of sulfonated EPDM and polystyrene-Co-4-vinyl pyridine is prepared by charging the required amounts of each polymer to a flask, adding xylene in sufficient quantity to produce the desired concentration and stirring at room temperature until a homogeneous solution is obtained. This generally requires from 2 to 24 hours depending on the concentration required.

EXAMPLE 4

Comparison of Polymer Complex, Sulfonated EPDM and EPDM Solution Viscosity as a Function of Temperature, With and Without the Addition of Polar Solvent Solutions were prepared as described in Example 3 of the sulfonated EPDM (10 meq. zinc sulfate)-polystyrene-Co-4-vinyl pyridine complex, sulfonated EPDM (10 meq. sulfonate) and EPDM (backbone EPDM used to prepare the sulfonated EPDM). Viscosity measurements were measured at various temperatures using a Brookfield Viscometer over a range of 0° to 120° C., for each solution. To measured volumes of each solution, various levels of hexanol were added and viscosity vs. temperature obtained. The data are summarized in Table I. The viscosity of the sulfonated EPDM solution shows a marked decrease with increasing temperature. The viscosity of the polymer complex solution shows a much flatter (more isoviscous) temperature relationship. The addition of hexanol to the complex provides an even more temperature insensitive profile. It is important to note that in all cases, the complex behaves quite differently from the sulfonated EPDM-based solutions in terms of the viscosity-temperature relationships.

EXAMPLE 5

Comparison of Polymer Complex and Sulfonated EPDM Solution Viscosity As A Function of Concentration Solutions were prepared as described in Example 3 of 5% concentration of sulfonated EPDM (10 meq. of zinc sulfonate per 100 g.) in xylene; 5% sulfonated EPDM plus 0.6% polystyrene-Co-4-vinyl pyridine in xylene (Complex A); and 5% sulfonated EPDM plus 1.2% polystyrene-Co-4-vinyl pyridine in xylene (Complex B). Viscosity measurements at 25° C. were obtained of each solution and of xylene dilutions, as noted in Table II.

The data of Table II show that at high concentrations, the solutions containing the complex have relatively lower viscosities as compared to solutions of sulfonated EPDM. On the other hand, the solutions containing the complex maintain higher viscosities at lower concentrations.

These results are very critical for the following reasons. While ionomer solutions, such as sulfonated EPDM in oil or other hydrocarbons, are very effectively viscosified at high polymer levels (i.e., >1 or 2%) this very characteristic gives rise to solutions at high polymer levels (5 to 10%) which are too viscous to handle. Yet when such polymers are diluted to low polymer levels ($\leq 1\%$) the viscosity decreases very rapidly and actually becomes less than that of a polymer without ionic groups. Technologically, this is a major deficiency since it is desirable to have viscosification at a very low polymer level. It is evident from the data in Table II that the polymer complexes perform that function. As a consequence, the very desirable result is that the solution viscosity of these polymer complexes can be less variant with polymer concentration than almost any other viscosification approach. Furthermore, the ratios of the polymer components can be altered to vary the viscosity-concentration of the polymer solution at will.

As an example, the data in Table II show that the viscosity of sulfonated EPDM solution at the 5% level is $9.55 \times 10^5$ cp., while at 1.5% that value is 46 cp, a change of about 20,000. In contrast, the complex, at comparable polymer levels, (4% sulfonated EPDM+0.96% styrene-vinyl pyridine copolymer) exhibits a viscosity of 8000 cp. The same complex, at a total polymer level of only 1.24%, exhibits a viscosity of 35 cp., a change of only a factor of 2,000. It is clear that the change of the solution viscosity of the complex is a factor of 100 less than that of the sulfonate ionomer.

The explanation for this novel behavior is that the ionomer viscosity, at high concentrations, is attributable to interpolymer associations, while at low concentrations, intraassociations occur, which are not effective in viscosification. The complex, however, markedly enhances interpolymer associations, even at dilute polymer levels, and viscosity is thereby enhanced.

tained for each solution of xylene dilutions as noted in Table III.

TABLE I

Solution Viscosity of Polymer Components and Complexes With and Without Polar Cosolvent in Xylene

| Sample 9234- | EPDM Polymer | % EPDM Polymer | % Styrene-Co-4-Vinyl Pyridine | % Hexanol | Viscosity (CP) at Temperature (°C.) | | | | | |
|---|---|---|---|---|---|---|---|---|---|---|
| | | | | | 0 | 25 | 50 | 75 | 100 | 120 |
| A | EPDM | 1.5 | 0.5 | — | 5.20 | 3.48 | 2.56 | 2.00 | 1.60 | 1.40 |
| B | EPDM | 1.5 | 0.5 | 2 | 5.00 | 3.30 | 2.32 | 1.84 | 1.46 | 1.30 |
| C | 10 meq. Sulfo-EPDM | 1.5 | — | — | 5,000 | 135 | 20 | 7.80 | 4.50 | 3.39 |
| D | 10 meq. Sulfo-EPDM | 1.5 | — | 2 | 6.96 | 4.96 | 4.05 | 3.40 | 2.85 | 2.37 |
| E | 10 meq. Sulfo-EPDM | 1.5 | 0.5 | — | 352 | 166 | 95 | 51 | 27.3 | 15.3 |
| F | 10 meq. Sulfo-EPDM | 1.5 | 0.5 | 0.5 | 202 | 127 | 76 | 43 | 23.8 | 14.2 |
| G | 10 meq. Sulfo-EPDM | 1.5 | 0.5 | 1 | 83.5 | 75.4 | 56 | 36.3 | 21.5 | 13.6 |
| H | 10 meq. Sulfo-EPDM | 1.5 | 0.5 | 2 | 30.2 | 31.9 | 29.3 | 23.3 | 16.1 | 10.5 |

TABLE II

Solution Viscosity of Polymer and Sulfonated EPDM as a Function of Concentration

| | Sulfo-EPDM (10 meq, TP398) | Complex A - Sulfo-EPDM + | | Complex B - Sulfo-EPDM + | |
|---|---|---|---|---|---|
| % | Viscosity, cp | % P—Sty—CO—4 Vinyl Pyridine | Viscosity cp. | % P—Sty—CO—4 Vinyl Pyridine | Viscosity cp |
| 5 | 955,000 | 0.6 | 120,000 | 1.2 | 13,000 |
| 4 | 700,000 | 0.48 | 48,000 | 0.96 | 8,000 |
| 3 | 247,000 | 0.36 | 39,000 | 0.72 | 5,000 |
| 2 | 5,000 | 0.24 | 10,000 | 0.48 | 1,400 |
| 1.5 | 46 | 0.18 | 2,100 | 0.36 | 490 |
| 1 | 5 | 0.12 | 25 | 0.24 | 35 |

TABLE III

Solution Viscosity of High Molecular Weight Polystyrene—Co—4-Vinyl Pyridine Sulfonated EPDM and Polymer Complex as a Function of Concentration

| Sulfo EPDM 10 meq. Zinc Sulfonate | | High Molecular Weight P—Sty—Co—4-Vinyl Pyridine | | Sulfo-EPDM, High M.W. P—Sty—Co—4-Vinyl Pyridine Complex | | |
|---|---|---|---|---|---|---|
| % | Viscosity, cp | % | Viscosity, cp | % Sulfo EPDM | % P—Sty—CO—4VP | Viscosity, cp |
| 5 | 955,000 | 3 | 310 | 3 | 0.72 | 1,650,000 |
| 4 | 700,000 | 2 | 70 | 2 | 0.48 | 680,000 |
| 3 | 247,000 | 1 | 10.5 | 1 | 0.24 | 160,000 |
| 2 | 5,000 | 0.5 | 3.5 | 0.5 | 0.12 | 7,200 |
| 1.5 | 46 | 0.25 | 1.8 | 0.25 | 0.06 | 15.6 |
| 1.0 | 5 | | | | | |

EXAMPLE 6

Polymer Complex With Higher Molecular Weight Polystyrene-Co-4-Vinyl Pyridine. Comparing Polymer Complex, Sulfonated EPDM and Polystyrene-Co-4-Vinyl Pyridine Viscosity as a Function of Concentration A higher molecular weight copolymer of styrene and 4-vinyl pyridine was prepared in a similar manner described in Example 1, by deleting the dodecylthiol from the reaction ingredients.

The resulting product contained 1.13% nitrogen corresponding to 8.4 mole percent 4-vinyl pyridine incorporation.

Solutions were prepared in xylene, as described in Example 3, of this higher molecular weight polystyrene-Co-4-vinyl pyridine, and a complex containing 3% (by weight) sulfonated EPDM (10 meq. zinc sulfonate) and 0.72% (by weight) of the polystyrene-Co-4-vinyl pyridine. Viscosity measurements at 25° C. were obtained for each solution of xylene dilutions as noted in Table III.

These data convincingly demonstrate that a combination of the copolymer of styrene and 4-vinyl pyridine with the zinc sulfo EPDM provides a solution whose viscosity is much enhanced over that of either component polymer even though the complex is lower in concentration. For example, the sulfo EPDM solution has a viscosity of about 5 cp at 1% polymer, the styrene vinyl pyridine copolymer has a viscosity of 10.5 cp at that same concentration, while the complex exhibits a viscosity of over 7000 cp at a total polymer concentration of 0.62%.

Clearly, the complex, even at very dilute concentrations, is a more effective thickening system for hydrocarbon fluids. There are other unique characteristics of these solutions as well, but more importantly these data demonstrate that the complex provides enhanced intermolecular associations and minimizes the intramolecular associations which are counterproductive in the thickening efficiency of the Sulfo EPDM solutions.

Since many modifications and variations of this invention may be made without departing from the spirit or scope of the invention thereof, it is not intended to limit the spirit or scope thereof to the specific examples thereof.

What is claimed is:

1. A method for controlling the viscosity of an organic liquid, said organic liquid having a solubility parameter of less than 9.5, and a viscosity of less than about 35 centipoise, said organic liquid being selected from the group consisting of alkanes, cycloalkanes and aromatic hydrocarbons and mixtures thereof, which consists essentially of incorporating in said organic liquid about 0.05 to about 20 grams of a water insoluble coordination polymer complex per 100 ml of said organic liquid, said water insoluble coordination polymer complex being the reaction product through coordination bonding of a neutralized sulfonated polymer which is water insoluble and an amine containing copolymer which is water insoluble, said amine containing copolymer being formed by a free radical emulsion polymerization process from a vinyl pyridine monomer and an alpha-beta ethylenically unsaturated monomer, the amount of said vinyl pyridine in said amine containing polymer being about 0.05 to about 50.0 weight percent of the copolymer, said sulfonated polymer having a polymer backbone with a solubility parameter of less than 10.5 and a crystallinity of less than 25%, said sulfonated polymer having about 4 to about 100 meq. of neutralized pendant sulfonate groups per 100 grams of sulfonated polymer and having a number average molecular weight of about 5,000 to about 500,000, said neutralized pendant sulfonate groups being neutralized with a metal ion selected from the group consisting of zinc, and transition metal ions of the Periodic Table of Elements, said amine containing copolymer having a polymer backbone having a solubility parameter of less than 10.5 which is substantially soluble in said organic liquid, the weight ratio of the sulfonated polymer to the amine containing polymer being about 20/1 to to 1/20.

2. The method of claim 1, further including a polar cosolvent, wherein the solubility parameter of said polar cosolvent is greater than the solubility parameter of said organic liquid, wherein said polar cosolvent comprises from about 0.1 to 40 weight percent of the total mixture of said organic liquid, said polymer complex and said polar cosolvent.

3. The method of claims 1 or 2, wherein said organic liquid has a viscosity of 100° F. of less than 35 centipoises.

4. The method of claims 1 or 2, wherein said organic liquid is a lubricating oil.

5. The method of claims 1 or 2, wherein said sulfonated polymer is a sulfonated EPDM terpolymer.

6. The method of claims 1 or 2, wherein said sulfonated polymer is selected from the group consisting of sulfonated ethylene, sulfonated propylene, sulfonated ethylene-propylene copolymers and terpolymers, wherein the third monomer is a nonconjugated diene hydrocarbon having from 5 to 15 carbon atoms and sulfonated polystyrene.

7. The method of claim 2, wherein said polar cosolvent is an alcohol.

8. The method of claim 2, wherein said polar cosolvent has a boiling point of at least 50° C.

9. A composition of matter consisting essentially of:
   (a) an organic liquid having a solubility parameter of less than 9.5 and a viscosity of less than 35 centipoise, said organic liquid being selected from the group consisting of alkanes, cycloalkanes and aromatic hydrocarbons and mixtures thereof;
   (b) about 0.05 to about 20 grams of a water insoluble coordination polymer complex dissolved in 100 ml of said organic liquid, said water insoluble polymer complex being the reaction product through coordination bonding of a neutralized sulfonated polymer which is water insoluble and a amine containing polymer which is water insoluble, said amine containing polymer being formed from a free radical emulsion polymerization process of a vinyl pyridine monomer and an alpha-beta ethylenically unsaturated monomer, the amount of said vinyl pyridine in such amine containing polymer being about 0.05 to about 50.0 weight percent of the copolymer, said sulfonated polymer having a polymer backbone with a solubility parameter of less than 10.5 and a crystallinity of less than 25%, said sulfonated polymer having about 4 to about 100 meq. of neutralized pendant sulfonate groups per 100 grams of sulfonated polymer and having a number average molecular weight of 5,000 to 500,000, said neutralized pendant sulfonate groups being neutralized with a metal ion selected from the groups consisting of zinc, Groups I and IIA of the Periodic Table of Elements and transition metal ions of the Periodic Table of Elements, said amine containing copolymer having a polymer backbone having a solubility parameter of less than 10.5 which is substantially soluble in said organic liquid, the weight ratio of the sulfonated polymer to the amine containing polymer being about 20/1 to 1.1/1 or about 1/1.1 to 1/20.

10. The composition of claim 9, wherein said amine containing polymer is a copolymer of styrene-vinyl pyridine copolymer.

11. The composition of claim 9, wherein said sulfonated polymer is a sulfonated EPDM terpolymer.

12. The composition of claim 9, wherein said sulfonated polymer is selected from the group consisting of sulfonated ethylene, sulfonated propylene, sulfonated ethylene-propylene copolymers and terpolymers, wherein the third monomer is a nonconjugated diene hydrocarbon having from 5 to 15 carbon atoms and sulfonated polystyrene.

* * * * *